Oct. 27, 1964　　　C. R. JOHNSON ETAL　　　3,153,932
SEAL FOR DISPLACER OPERATED MECHANISM
Filed Oct. 15, 1962
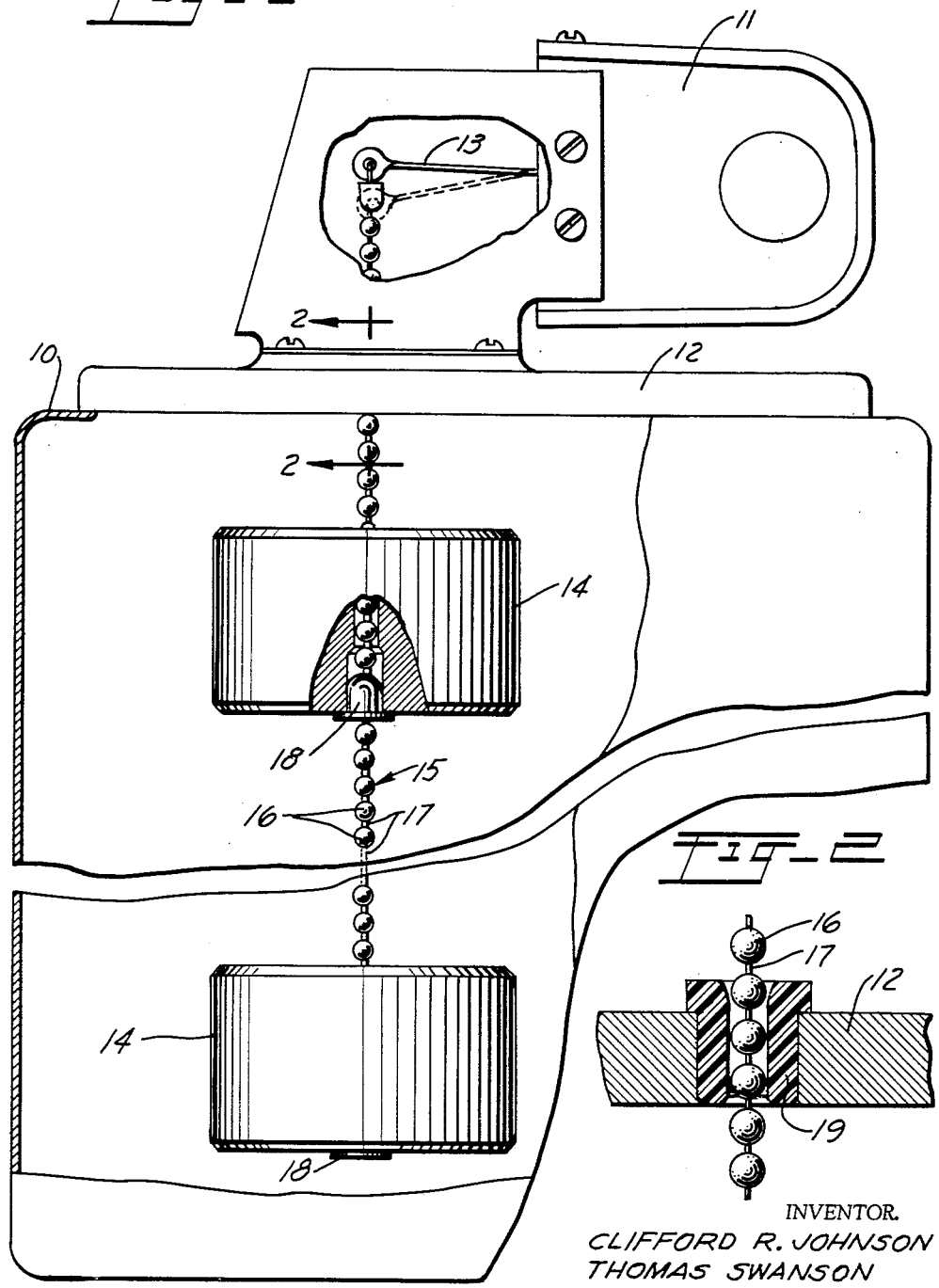
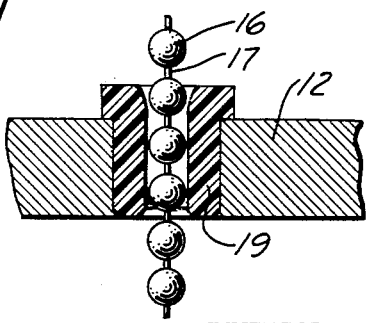
INVENTOR.
CLIFFORD R. JOHNSON
THOMAS SWANSON
BY
ATTORNEYS

United States Patent Office 3,153,932
Patented Oct. 27, 1964

3,153,932
SEAL FOR DISPLACER OPERATED MECHANISM
Clifford R. Johnson, Naperville, and Thomas H. Swanson, Downers Grove, Ill., assignors to Fred H. Schaub Engineering Co., Downers Grove, Ill., a corporation of Illinois
Filed Oct. 15, 1962, Ser. No. 230,497
5 Claims. (Cl. 73—309)

This invention relates to seals for displacer operated mechanisms and more particularly to a seal structure for use on a tank containing hot water and low pressure steam.

Condensate tanks and similar containers receiving hot water which may steam to a degree are commonly provided with control devices such as electric switches operated in response to changes in the level of water in the tanks by displacers in the tanks. For such uses it is necessary to provide a seal around the actuating member which connects the displacers to the control devices to prevent free escape of steam from the tank. However, for accurate operation the seal must be substantially frictionless to avoid interference with movement of the actuating member and operation of the control. Seals as heretofore known are either incapable of effectively sealing against the escape of low pressure steam or create friction which interferes in accurate functioning of the control device.

It is accordingly one of the objects of the present invention to provide a seal for a displacer operated mechanism which is substantially frictionless and which effectively seals against the passage of low pressure steam or similar vapor.

According to a feature of the invention the seal is formed by a non-metallic plastic bushing having an elongated cylindrical opening therethrough, and the actuating member is formed by a series of spaced elements having relatively small clearance with the walls of the opening and so spaced apart that at least two elements will lie in the opening at all times. Preferably the actuating member is formed by a chain having a series of spaced cylindrical elements passing through an opening of circular section which is of slightly larger diameter than the chain elements. The above and other objects and features of the invention will be more readily apparent from the following description when read in connection with the accompanying drawing, in which:

FIGURE 1 is a side elevation with parts broken away and in section showing a seal and displacer combination embodying the invention and FIGURE 2 is a partial detail section on the line 2—2 of FIGURE 1.

The invention is illustrated as applied to a tank 10 which may be a condensate tank for receiving and holding hot condensate in a boiler installation. As is understood the condensate comes into the tank from one or more condensers and is pumped from the tank by the water pumps.

Supply of condensate to the tank is controlled by a control device such as an electric switch 11 mounted on the top of the tank, preferably on a supporting plate 12 which is secured over an opening in the top of the tank in sealing relationship therewith. The switch is operated by a pivoted arm 13 which projects generally horizontally from the switch and which is movable from an upper position shown in full lines to a lower position shown in dotted lines by a displacer mechanism.

As shown the displacer mechanism comprises two spaced displacers 14 which are connected together and to the switch operating arm 13 by an elongated actuating element 15 shown as comprising a chain of the type having spaced spherical elements 16 connected by short links 17 of reduced section. Chains of this type are well known and will not be further described herein. The displacers may be secured to the chain by cap members 18 which snap over one of the spherical elements 16 and which are received in openings through the displacers so that the displacers can be secured to the chain in any one of a plurality of selected positions. The chain extends through an opening in the mounting plate 12 and is secured at its upper end to the switch actuating arm 13. With this construction, when the liquid level in the tank falls below the top of the lower displacer 14, the weight of the displacer will move the arm 13 down to the dotted line position. As the level rises the arm 13 will remain in its lower position until the upper displacer is partially submerged in the liquid. At this time the effective weight of the displacer becomes quite small and the switch arm 13 is moved to its upper position by a spring in the switch mechanism. Thus the switch will be operated in one direction, for example will be closed when the level in the tank falls below the top of the lower displacer and will be moved to its other position, for example opened, when the level in the tank rises above the bottom of the upper displacer.

According to the present invention the chain is sealed in the mounting plate 12 against leakage of steam or vapor therepast by a novel seal structure best shown in FIGURE 2. The mounting plate 12 is formed with an enlarged circular opening therethrough which receives a bushing 19 formed of non-metallic plastic material such, for example, as nylon or Teflon. The bushing has a force fit in the opening in the mounting plate 12 to hold it in place therein and is formed with an elongated cylindrical bore therethrough of a diameter slightly larger than the diameter of the spherical chain elements 16. In one desirable construction the spherical chain elements 16 have a diameter of $3/16$ inch and the diameter of the cylindrical bore through the bushing 19 is about .203 inch, leaving a total clearance between the chain elements and side walls of the bore of the order of .012 to .015 inch. It will further be seen that the cylindrical bore through the bushing is approximately three times the spacing between adjacent chain elements 16, so that as the chain moves through the bushing at least two chain elements will lie in the cylindrical bore at all times.

With the parts assembled as shown in the drawing, and with the tank 10 containing hot condensate which produces a certain amount of low pressure steam, the steam or vapor will tend to flow through the spaces between the chain elements and the walls of the bore in the bushing. Because the bushing is non-metallic it will not be heated to the extent that a similar metallic element would, and because the chain is exposed above the mounting plate 12 to relatively cooler surrounding atmosphere, the elements thereof which lie in the bushing will also be cooler than the surrounding structure. Due to these facts steam or vapor tending to flow through the bushing around the chain will condense in the bushing to maintain the spaces between the chain elements of the bushing filled with water or similar liquid. Since these spaces are relatively small, this liquid will provide an effective seal against the escape of steam or vapor, but at the same time will impose substantially no friction upon movement of the chain. Therefore, by the present construction the escape of steam or vapor is effectively prevented without interfering with the accuracy of the control.

While one embodiment of the invention has been shown and described in detail, it will be understood that this is illustrative only and is not to be taken as a definition of the scope of the invention, reference being had for this purpose to the appended claims.

What is claimed is:
1. A seal structure comprising in combination with a container adapted to contain low pressure steam a bushing extending through a wall of the container and formed with an elongated cylindrical opening therethrough and an elongated actuating member extending movably through the opening, the actuating member including a series of spaced elements of transverse section corresponding to the transverse section of the opening and smaller than the opening to leave a relatively small clearance with the walls thereof, the elements being spaced apart a distance not exceeding about one third the length of the opening so that two of the elements lie in the opening at all times.

2. A seal structure comprising in combination with a container adapted to contain low pressure steam a bushing extending through a wall of the container and formed with an elongated cylindrical opening of circular section therethrough, and an elongated actuating member extending movably through the opening and formed of a series of spaced connected spherical elements slightly smaller than the opening to leave a relatively small clearance with the walls thereof, the elements being spaced apart not over about one third the length of the opening so that two of the elements will lie in the opening at all times.

3. The seal of claim 2 in which the bushing is of non-metallic plastic material and the elements are of metal.

4. A displacer operated mechanism in combination with a tank adapted to contain hot water and low pressure steam comprising a device to be operated in response to level variations in the tank and mounted above the top of the tank, means defining a vertically elongated cylindrical opening in the top of the tank, an elongated actuating member extending vertically through the opening and connected to said device to operate it, and displacer means in the tank connected to the actuating member to move it in response to variations in level in the tank, the actuating member including a series of vertically spaced connected elements of the same section as and slightly smaller than the opening and spaced apart a distance not over about one-third the length of the opening so that two elements will lie in the opening at all times.

5. The mechanism of claim 4 in which the opening is defined by a non-metallic bushing and the actuating member is a metal chain with spaced spherical elements.

References Cited in the file of this patent
UNITED STATES PATENTS
2,385,946    Schorer _____ Oct. 2, 1945